United States Patent [19]

Galbiati

[11] Patent Number: 4,595,500
[45] Date of Patent: Jun. 17, 1986

[54] FILTER FOR PURIFYING DRINKABLE AND NON-DRINKABLE WATER

[76] Inventor: Mauro Galbiati, 17 Aspromonte Square, Milan, Italy

[21] Appl. No.: 630,212

[22] Filed: Jul. 12, 1984

[30] Foreign Application Priority Data

Jul. 28, 1983 [IT] Italy ............... 22535/83[U]
Feb. 17, 1984 [IT] Italy ............... 19693 A/84

[51] Int. Cl.⁴ ............................. B01D 25/02
[52] U.S. Cl. ..................... 210/266; 210/288; 210/424
[58] Field of Search ............ 210/266, 282, 288, 424, 210/493.1, 493.5, 436, 472, 321, 1, 420–423

[56] References Cited

U.S. PATENT DOCUMENTS 3,327,859  6/1967  Pall .................... 210/266
3,951,811  4/1976  Casolo et al. .......... 210/282
4,379,053  4/1983  Brane ................... 210/424

*Primary Examiner*—Ivars Cintins
*Attorney, Agent, or Firm*—Bucknam and Archer

[57] ABSTRACT

A filter for purifying drinkable and non-drinkable water is described, which comprises a body (1) for association with a water inlet and defining an inlet end (2) in communication with a purifying filter including sequentially a bacteria hold-back membrane (23) and an active carbon zone (31), and deflector means (40–74) which may be positioned in a first position, where the inlet end (2) is in communication with a direct water dispensing conduit (41–71) by bypassing the purifying filter, and in a second position, where the communication between the inlet end (2) and the direct water dispensing conduit is cut off and where the dispensing through a purified water conduit (42–71) is allowed.

11 Claims, 16 Drawing Figures

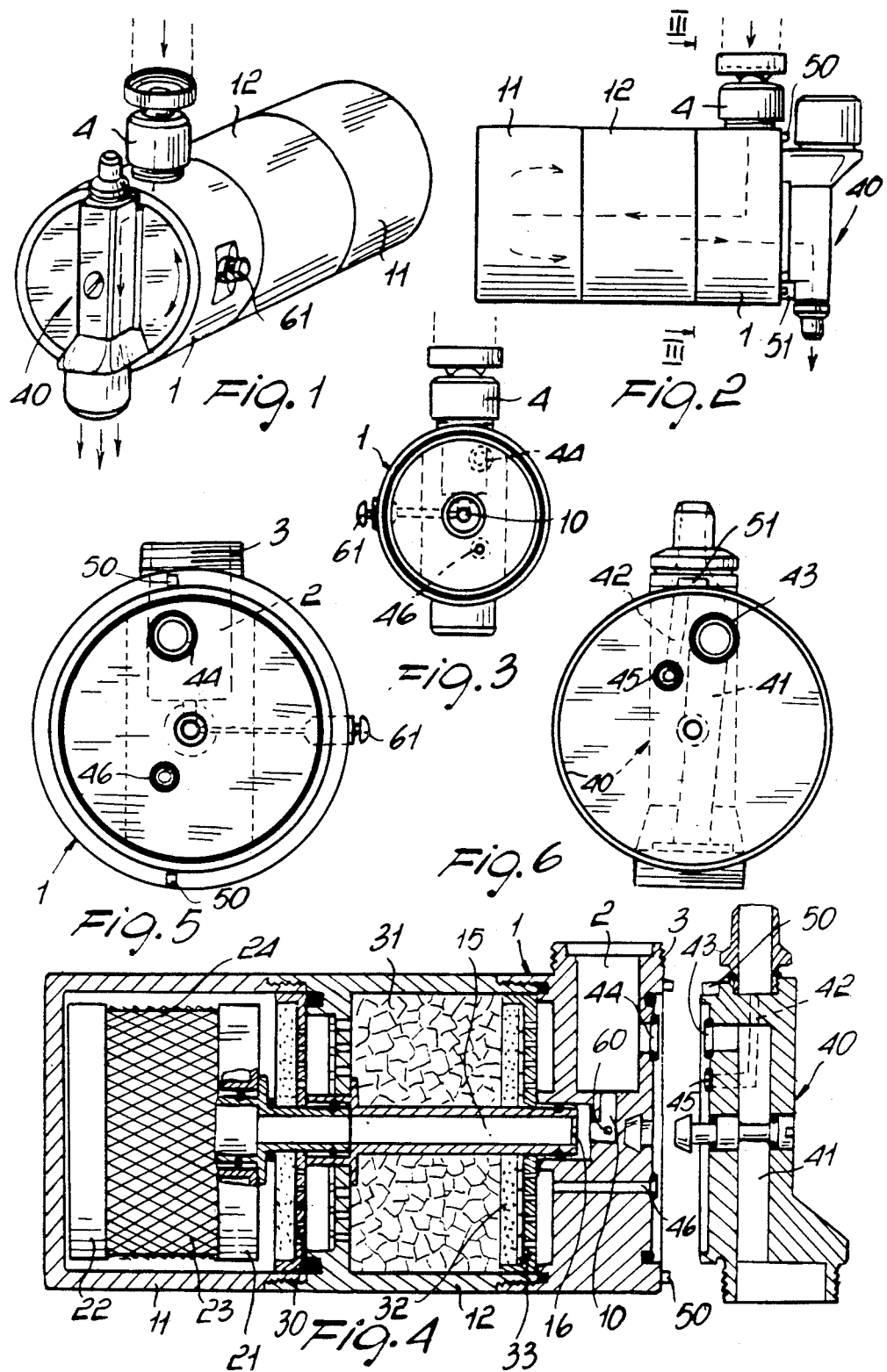

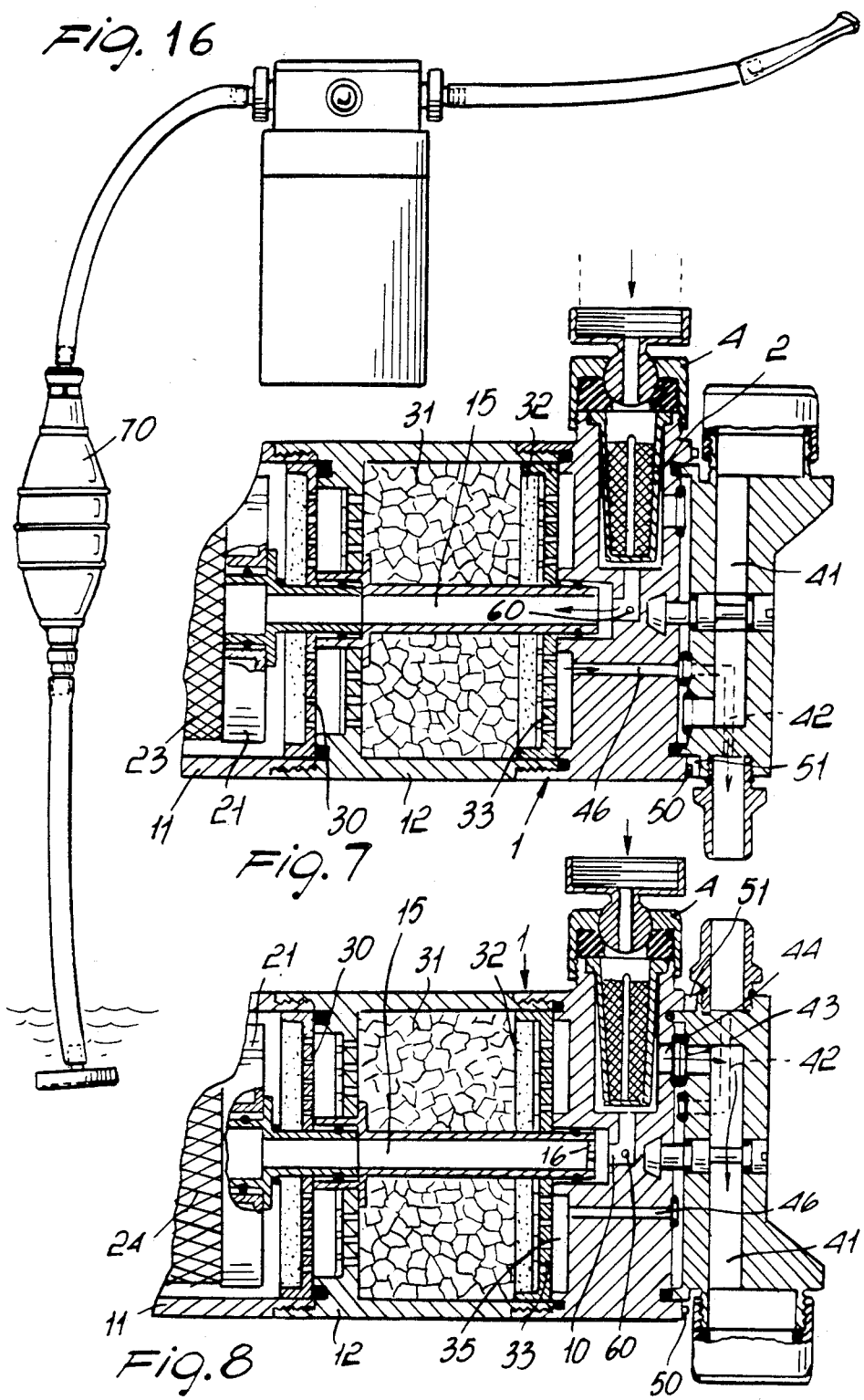

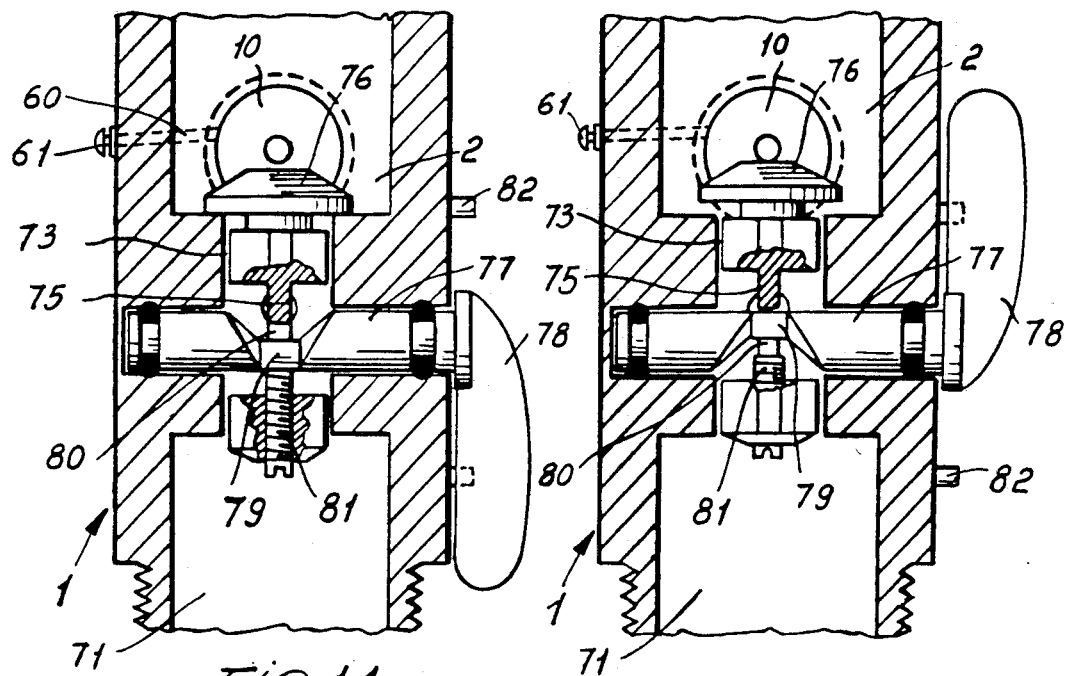
Fig. 14
Fig. 15
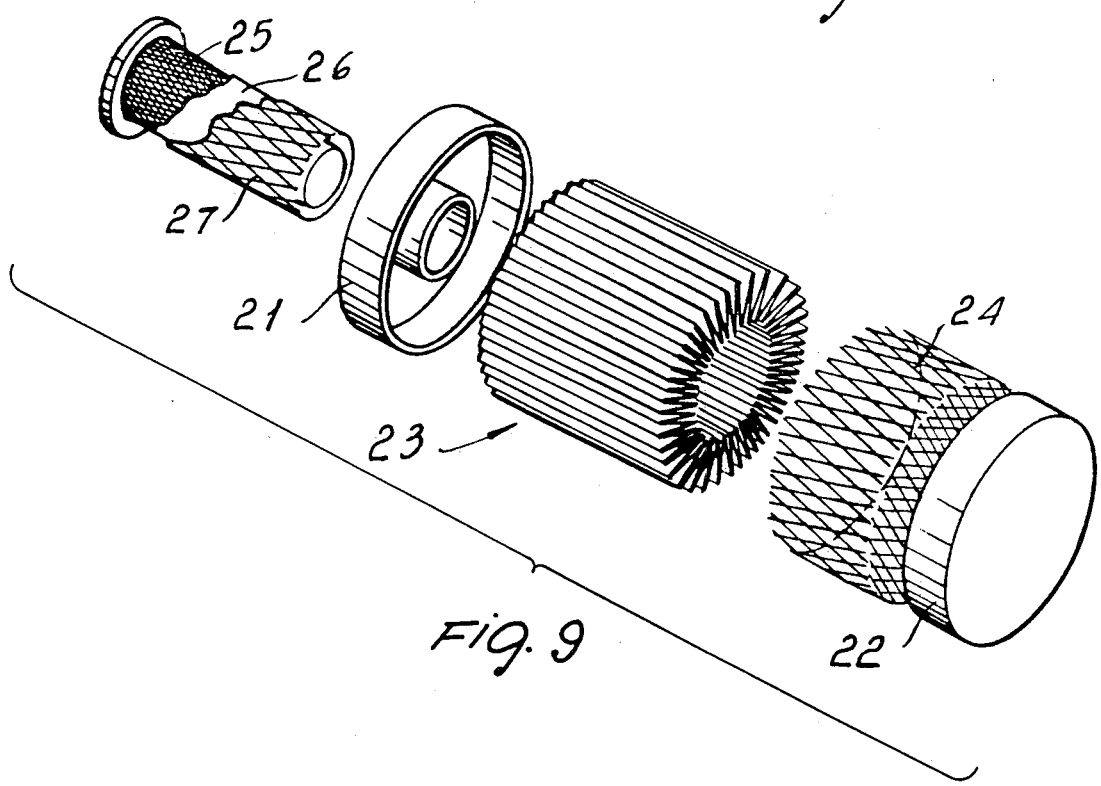
Fig. 9

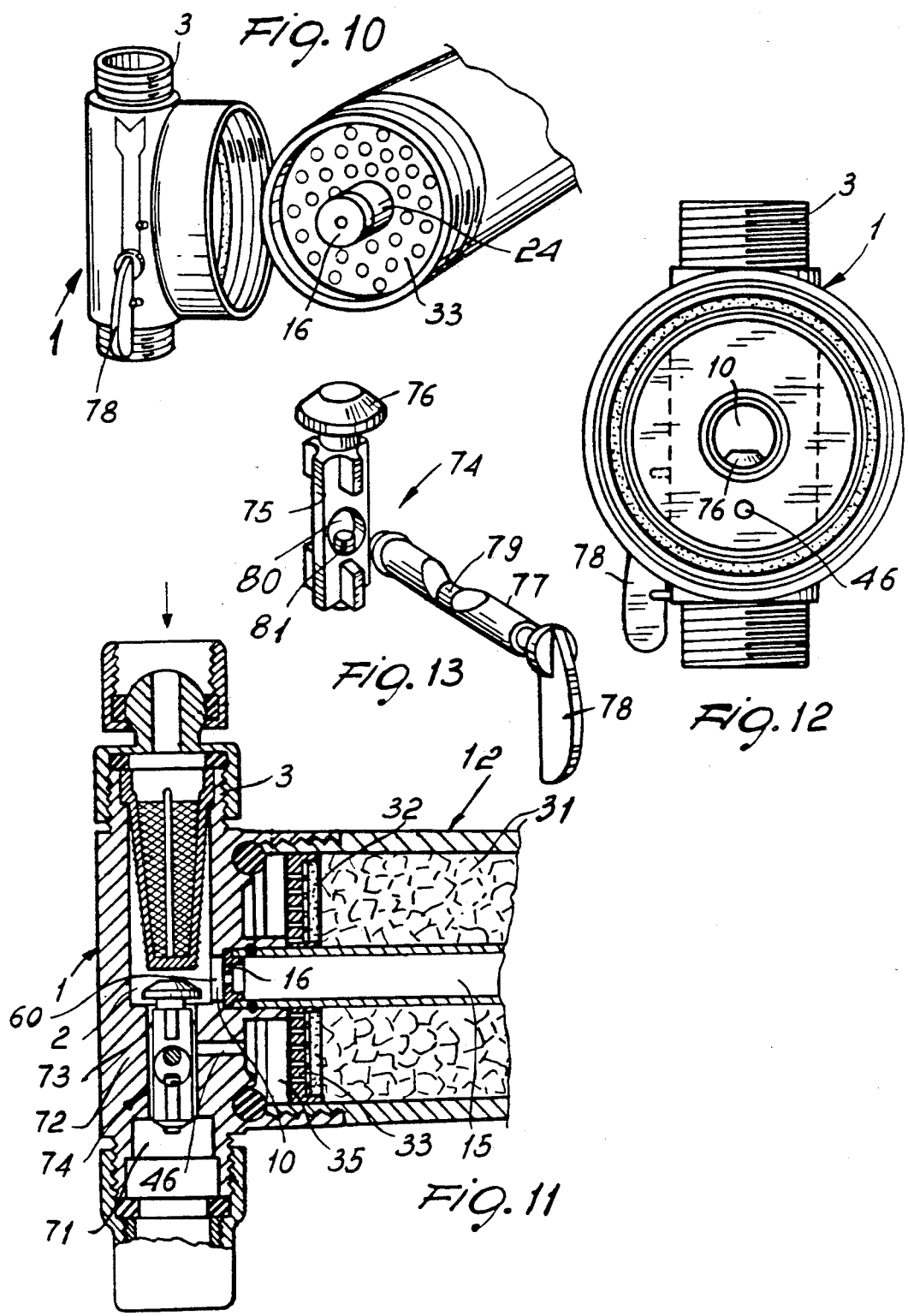

FILTER FOR PURIFYING DRINKABLE AND NON-DRINKABLE WATER

This invention relates to a filter for purifying drinkable and non-drinkable water.

As it is known, filters have been available on the market for purifying drinkable water, which, in practice, restrict their action to dechlorinating water. Such filters comprise a cartridge containing active carbon, through which the stream of water from a faucet is flown.

According to some known methods, the entire volume of the water flowing out of the faucet is caused to pass through the filtering body, so that a short residence time on the carbons is provided, and the carbon is rapidly consumed, thus requiring frequent replacement.

Other known methods provide for the utilization of a filter having a diverter adapted to dispense the water without passing it through the carbon whenever non-purified water is demanded, or to pass it through the carbon, where water is to be purified. Usually, the filtering body is provided with a dispensing end spatially separated form the purified water dispensing end.

The latter filter type generally has a complex construction, and does not allow the size of the filtering body to be changed to meet contingent requirements, so that in the presence of a chlorine rich water, purification is definitely unsatisfactory.

Still another disadvantage of the above-mentioned filters is that such filters are unable to remove any bacteria present in the water, while the bacteria, in many cases, may contaminate the active carbon as well.

A further problem encountered with prior filtering cartridges is that, if air bubbles form within the filtering body due to a prolonged period of non-use, or other causes, it is with great difficulty that the bubbles can be removed and a proper flow of the water being dispensed can be achieved.

This invention is, in fact, directed to obviate such prior shortcomings by providing a filter for purifying drinkable water, which in addition to removing any chlorine present therein, can form a barrier for complete removal of bacteria from the water, thus performing a thorough purification of the water.

It is a particular object of the invention to provide a filter which allows water to be selectively conveyed through the filter assembly, while having the two dispensing outlets of purified and non purified water at all times flowing into one and the same location.

Another object of this invention is to provide a filter structure for purifying drinkable water, which is simplified construction-wise and affords an active carbon filtering zone which may be sized as desired to meet contingent requirements, while being always assured of complete purification of the water even in the least favorable of conditions.

A further object of the invention is to provide a filter, which on account of its peculiar construction, can be assembled in a quick and simplified manner to any faucet types, as well as any water inlet, and give full assurance of being safe and reliable to use.

The above object, as well as these and other objects such as will be apparent hereinafter, are fulfilled and are achieved, respectively, by a filter for purifying drinkable and non-drinkable water, according to the invention, characterized in that it comprises a body adapted for association with a water inlet and defining an inlet end in communication with a purifying filter having, sequentially arranged, a bacteria hold-back membrane and an active carbon zone, and with diverting means being positionable at a first position, where said inlet end is in communication with said direct water dispensing conduit by bypassing said purifying filter, and at a second position, where the communication between inlet end and said purified water dispensing conduit is cut off and where the dispensing through a purified water conduit is allowed.

Further features and advantages will be more clearly apparent from the following detailed description of a filter structure for purifying drinkable water, as illustrated by way of example and not of limitation in the accompanying drawings, where:

FIG. 1 shows a diagrammatic perspective view of a filter according to the invention;

FIG. 2 is a side view of the filter showing the flow path for the delivery of purified water;

FIG. 3 is a view taken along the line III—III of FIG. 2, showing venting means for exhausting any air bubbles;

FIG. 4 is a sectional, partly exploded, view of the filter;

FIG. 5 shows the head of the filter body;

FIG. 6 shows the configuration of the diverter body;

FIG. 7 shows the filter in cross-section, as positioned for delivery of purified water;

FIG. 8 shows the filter in corss-section, as positioned for direct delivery of water, bypassing the filter body;

FIG. 9 shows the bacteria hold-back membrane in exploded perspective view;

FIG. 10 schematically shows in perspective view the filter structure in open position, according to an alternative embodiments of the deflector means;

FIG. 11 is a central section of the structure of FIG. 10;

FIG. 12 shows the attachment member of the cartridge constituting the purifying filter according to the embodiment of FIG. 10;

FIG. 13 shows in exploded perspective view the shutter means controlling the water inlet flow and the outlet chamber, always according to the embodiment of FIG. 10;

FIGS. 14 and 15 show, in cross-section, the shutter means of FIG. 10 in the two different operative positions;

FIG. 16 illustrates a simplified embodiment of the filter, for application to water pick up by suction.

Making reference to the figures filter for purifying drinkable and non-drinkable water comprises a body, which is generally designated with the reference numeral 1, which defines an inlet end 2 formed with an outer thread 3 for connection to swivel unions 4 or the like elements which allow the inlet end 2 to be connected to a water inlet.

The inlet end is in communication, through a fitting 10, with a purifying filter, which advantageously comprises mutually assemblable segments comprising an end segment 11 having a bacteria holdback membrane and one or more intermediate segments 12 forming an active carbon water passage zone In detail, the filter body ha an axial conduit 15 which extends through all the segments and is in communication with the inlet fitting 10 for admitting into the purifying filter water entering the inlet end 2.

The axial conduit 15 may be provided with perforated diaphragms thereon, as indicated at 16, which serve the function of creating a pressure drop to retard the water flow through the filter.

The channel 15, which is defined by the individual portions in mutual sealed relationship formed in the various segments, is terminated at the end segment 11 which contains a front flange 21 to which the axial conduit 15 is connected and is bored axially, and a bottom flange 22 which holds, in cooperation with the front flange 21, a pleated membrane 23 in a substantially cylindrical arrangement, which has the function of preventing bacteria from passing through.

Tests carried out have shown that the membrane 23 can prevent the passage of bacteria of larger size than 0.45 microns.

Provided externally to the membrane 23 is a containment net 24 which prevents the membrane from being deformed by excess pressure.

Advantageously, in the interior of membrane, there is provided a fine mesh filter 25 which is wrapped in an outer cloth layer 26 which, additionally to acting as a further filtering element, also creates a significant pressure drop.

Also provided in a containment net 27 which surrounds the cloth layer 26 and encloses the element such as to prevent the membrane 23, in the event of sharp pressure variations, from being damaged.

The water flowing from the axial conduit 15 is obliged to pass through the membrane 23 in a radial direction and to flow into the end segment 11, from which it flows out past a drilled disk 30 which admits the water into the segment 12 which is filled with active carbon, generally indicated at 31.

The active carbon segment is closed at its end by a filtering disk 32 which has the function of further reducing the pressure level and preventing the active carbon from exiting the cartridge.

The felt filtering disk 32 is held pressed against a grid 33 positioned to close the purifying filter and being adapted to define an outlet chamber 35 wherein in practice the purified water through the filter is collected.

With reference to FIGS. 1-8, the inlet end 2 is in communication with a diverter body 40, as well as with the filtering body as outlined hereinabove, which is rotatably associated with the filter body and defines on its interior a direct water dispensing conduit 41 and purified water dispensing conduit 42.

More detailedly, the cited diverter body 40 has on its face next to the filter body 1 an inlet port 43 adapted for union with an inlet portion 44 in communication with the inlet end 2; also provided are ring seals to prevent water from leaking out.

As mentioned, the diverter body 40 also includes a purified water conduit 42, which also opens at the face adjacent the filter through a purified water inlet port, indicated at 45, which may be brought into alignment with a purified water discharge conduit 46 in communication with the purified water collecting chamber.

The conduits 41 and 42 have discharge ports to the diverter body which are located diametrically to each other.

The diverter body 40 may be positioned in to a first position where the inlet portion 44 is aligned to the port 43 and water entering the inlet let end 2, where a filtering body may be optionally provided, is passed directly into the water direct delivery conduit and out, practically bypassing the filtering body.

When purified water is to be dispensed, the diverted body is turned, as shown in FIG. 7. so that the the inlet portions 44 will be closed and the water admitted into the inlet end 2 obliged to flow through the filter body and undergo purification through the segments 11 and 12 of the filter body.

The purified water flows out of the conduit 46, which is aligned to the purified water discharge port 45, and is dispensed to the outside.

In order to achieve an accurate positioning of the diverter body 40 with respect to the filter body, such as to selectively communicate the direct delivery conduit to the inlet end 2, or the purified water conduit to the conduit 46, position detents are provided which comprise small pegs 50 located at two diametrical locations on the filter body and being adapted to engage a detent 51 defined on the diverter body 40 by contact, thus providing two positions of utilization.

The operation of the filter for purifying water according to the invention is quite simple. In fact, when the user does not require purified water, it will be sufficient for him/her to so turn the diverter body as to place the water direct delively conduit 41 in communication with the inlet portion 44, thus affording an easier path for the water to flow out and bypass the filter.

When the user wishes instead to dispense purified water, he/she will turn off the diverter body 40 so that the inlet portion 44 is brought out of communication with the fitting, and the purified water delivery conduit 42 is placed in communication with the conduit 46 from the purified water collecting chamber.

In these conditions, the water admitted into the inlet end 2 is obliged to flow through the axial conduit 15 and whence into the segment 11 after going through a fine mesh filter, cloth, and containment net, then flows through the bacteria barrier membrane 23 which will hold back all the bacteria in suspension thus avoiding contamination of the active carbon zone.

After passing through the membrane 23, the water flows through the active carbons 31 with a very slow motion, that is, one effective to promote an intimate contact between the water and active carbons resulting in thorough purification of the water. As mentioned above, with waters containing high clorine contents, the number of active carbon cartridges may be increased.

Furthermore, the provision of a modular cartridge affords for the user the advantage of only replacing the worn cartridge portion, which generally comprises the active carbon portion, liable to be spent at a definitely higher rate than the segment carrying the antibacteria membrane.

The water, on leaving the active carbon zone, enters the outlet chamber 35, and then, through the conduit 46, flows into the purified water delivery conduit 42, from where it is dispensed out.

It should be further added that when air bubbles form within the filter, such as would hinder a proper flow of the water therethrough, a vent conduit 60 is provided which opens at the fitting portion 10 and extends outwards where a small vent valve is provided as indicated at 61.

When air bubbles are present inside, it will be sufficient for the user, after connecting to the water inlet, to hold the venting valve 61 depressed until a few water drops flow out to thus make sure that the air bubbles have been removed from the inside and that the filtering cartridge can be properly used.

In FIGS. 10-15 there is shown an alternative embodiment of the deflector means of the waterflow.

In these figures the same reference numerals have been used to denote the previously described parts.

With reference to these FIGS. the body 1, in addition to the water inlet end or chamber 2, is provided also with a water delivery chamber 71, separated from the chamber 2 by a diaphragm 72.

The diaphragm 72 is provided with a hole 73 which is controlled by shutter means, generally denoted with 74, constituted by a stem 75 passing through the hole 73 and provided with an enlarged head 76 which practically acts as a sealing member for the hole 73.

The stem 75 is axially displaceable so that to be positioned in a first position, whereby the hole 73 is closed, and in a second position, whereby said stem allows the direct passage of water between the chamber 2 and the chamber 71.

The stem is operated by means of a small shaft 77 diametrically supported in the chamber 71 and extending sealingly outwardly from the body 1 whereat a lever 78 is provided for its operation.

The shaft 77, at a middle position thereof, has a tapering part 79 which is substantially offset with respect to rotation axis of the stem 77 and which engages with an opening 80 defined in the stem 75 and provided with a set screw 81 which engages with the tapering portion 79, so that rotation of the shaft 77 results, owing to the offsetting of the tapering portion 79, in an axial translation of the stem 75 and accordingly in the passage port 73 being uncovered or covered.

The operation of the filter is substantially similar to the one already described with reference to FIGS. 1–8.

In fact, in the instance where the user wants filtered water, it will be sufficient for him/her to turn the lever 78 so that the shutter means leaves the passage free through the hole 73 (Fig.15).

In such conditions, the water admitted into the chamber 2 is fully passed directly into the delivery chamber 71 without affecting the filtering group, because of its very high hydraulic resistance.

Where the user wants instead purified water to be delivered, he/she operated the lever 78 such that the enlarged head 76 covers the port 73 (FIG. 10), thereby the water is obliged to flow into the filtering gorup to flow, when the depuration has been achieved, into said chamber 35 and then into the delivery chamber 71 through the passage 46.

In this instance also, for the correct positioning of the lever 78, there are provided position detents comprising small pegs 82 against which said lever abuts.

As shown in FIG. 9, it is possible to provide a drinkable water purifying filter operating on a suction principle; in this case, the filter cartridge would be made without the movable diverter body, because all of the oncoming water would be previously purified. It is also contemplated that the delivery conduit may include a pumping element, indicated at 70, to promote suction and contribute to overcome all the pressure losses and drops which originate from within the filter body.

It may be appreciated from the foregoin description that the invention achieves its objects, and in particular, that the provision of a filtering membrane for holding back bacteria affords delivery of bacteriologically pure water and prevention of the active carbon contamination, while by passing the water to be purified first through the membrane and then through the active carbon, the carbon powder is prevented from rapidly clogging the membrane pores.

Another aspect of the invention is that the construction of the drinkable water purifying filter according to the invention is greatly simplified, and hence of relatively lower manufacturing cost. The invention as disclosed is susceptible to many modifications and variations without departing from the scope of the instant inventive idea.

Furthermore, all of the details may be replaced with other, technically equivalent elements.

In practicing the invention, the materials used, if compatible with the intended application, and the dimensions and contingent shapes, may be any selected ones to meet individual requirements.

I claim:

1. A filter for purifying drinkable and non-drinkable water, which comprises a water inlet, a first body (1) adapted for association with said water inlet and defining an inlet end (2) in communication with a purifying filter having, sequentially arranged, a bacteria hold-back membrane (23), an active carbon zone (31), and a diverting means (40, 74) in proximity of said inlet end (2) and in proximity of said first body (1), said diverting means being positionable in a first position, where said inlet end (2) is in communication with a direct water dispensing conduit (41, 71) and the water bypasses said purifying filter, and in a second position where communication between said inlet end (2) and said direct water dispensing conduit (41, 71) is cut off, and dispensing through a purified water conduit (42, 71) is allowed wherein said filter comprises means for selectively arranging said diverting means in said first or second position, said purifying filter has one modular segment (12) which contains active carbon (31) and wherein said segment (12) containing active carbon (31) is closed, at least at its outlet end by a felt filtering disk (32), said filter comprises a grid (33) externally of said filtering disk (32), said disk (32) pressing against said grid, and an outlet chamber (35) is defined between said filter body and sail purifying filter, said outlet chamber being selectively in communication with said purified water conduit.

2. A filter for purifying drinkable and non-drinkable water, which comprises a water inlet, a first body (1) adapted for association with said water inlet and defining an inlet end (2) in communication with a purifying filter having, sequentially arranged, a bacteria hold-back membrane (23), an active carbon zone (31), and a diverting means (40, 74) in proximity of said inlet end (2) and in proximity of said first body (1), said diverting means being positionable in a first position, where said inlet end (2) is in communication with a direct water dispensing conduit (41, 71) and the water bypasses said purifying filter, and in a second position where communication between said inlet end (2) and said direct water dispensing conduit (41, 71) is cut off, and dispensing through a purified water conduit (42, 71) is allowed wherein said filter comprises means for selectively arranging said diverting means in said first or second position, said diverting means are formed by a second body (40) fitted sealingly and rotatable to the filter body, said second body having on its surface facing the first filter body, a port (43) for the direct water dispensing conduit (41) and a second port (45) for the purified water conduit (42), said port (43) for the direct water dispensing conduit (41) being positionable in communication with said inlet end (2), said purified water dispensing port (45) being positionable in communication with said purifying filter.

3. A filter according to claim 2, wherein said purifying filter comprises modular segments (11, 12) removably associable therebetween and having one said bacteria hold-back membrane (23), and at least one active carbon zone.

4. A filter according to claim 3 wherein said modular segments comprise an end segment (11), said axial conduit (15) opens at said end segment (11) carrying said bacteria hold-back membrane (23), said membrane being pleated, said end segment having a front flange (21) for connection with said axial conduit and a rear flange (22), said front flange and rear flange supporting said membrane (23) therebetween for holding back bacteria and arranged in a cylindrical configuration, and said filter comprises a net (24) arranged externally of said membrane.

5. A filter according to claim 4 which comprises axially within said pleated membrane (23) a fine mesh filter (25) surrounded by an outer cloth (26) wrapped in a containment net (27).

6. A filter according to claim 2 wherein said purifying filter has a plurality of modular segments (11, 12), a fitting (10) in communication with said inlet end, an axial conduit (15) is formed by sealing engaging together conduit portions defined in said modular segments, said conduit being in communication with said fitting (10).

7. A filter according to claim 6 wherein said axial conduit (15) has a perforated diaphragm (16) adapted to generate a localized pressure drop.

8. A filter according to claim 2 which comprises means for positioning said diverting body (40) into said first and second position, said means comprising small pegs (50) provided diametrically on the first body and adapted to engage by contact with detent (51) defined on said second body (40).

9. A filter for purifying drinkable and non-drinkable water, which comprises a water inlet, a first body (1) adapted for association with said water inlet and defining an inlet end (2) in communication with a purifying filter having, sequentially arranged, a bacteria hold-back membrane (23), an active carbon zone (31), and a diverting means (40, 74) in proximity of said inlet end (2) and in proximity of said first body (1), said diverting means being positionable in a first position, where said inlet end (2) is in communication with a direct water dispensing conduit (41, 71) and the water bypasses said purifying filter, and in a second position where communication between said inlet end (2) and said direct water dispensing conduit (41, 71) is cut off, and dispensing through a purified water conduit (42, 71) is allowed wherein said filter comprises means for selectively arranging said diverting means in said first or second position and wherein said diverting means comprise a water delivery chamber (71) separated from said inlet end by a diaphragm (72), the diaphragm having an orifice (73) and shutter means for closing and opening said orifice.

10. The filter according to claim 9 wherein said shutter means comprise a stem (75) passing through said orifice (73) and providing with an enlarged head (76), and second means, controllable externally of said first body (1), to displace axially said stem (75) from a position where said enlarged head (76) closes said orifice (73) to a position where said enlarged head (76) disengages from said orifice (73).

11. The filter according to claim 10, wherein said second means comprise a shaft (77) mounted diametrically in said water delivery chamber (71), and a lever (78) mounted on said shaft, said shaft (77), said stem having an opening (80), said shaft having a central portion, a recess (79), and a screw engageable with said recess whereby rotation of the shaft provides for axial translation of said stem to cover or uncover said orifice (73).

* * * * *